F. L. PINNEY.
RAZOR STROP.
APPLICATION FILED NOV. 29, 1907
910,855.
Patented Jan. 26, 1909.
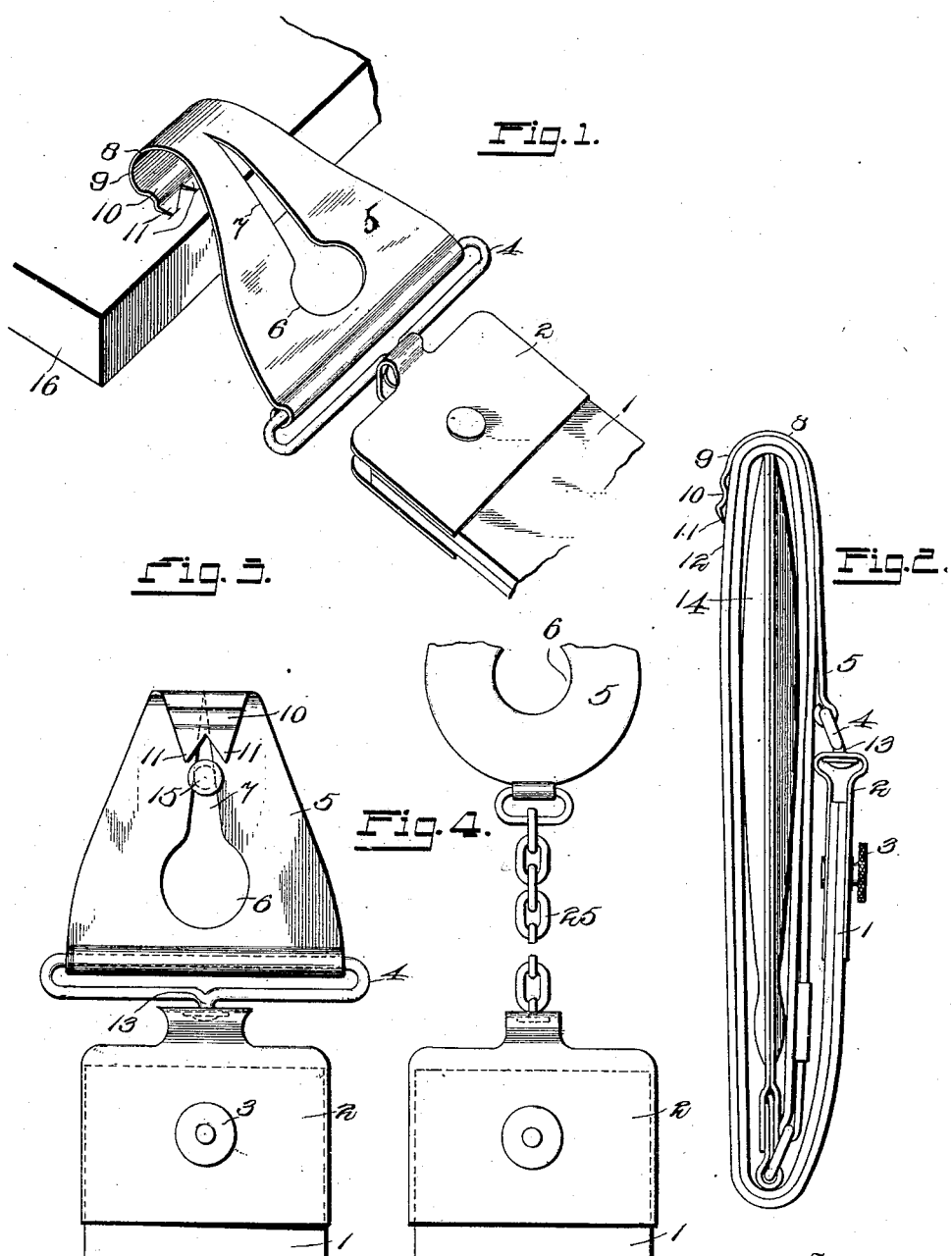

UNITED STATES PATENT OFFICE.

FRANK L. PINNEY, OF THE UNITED STATES NAVY.

RAZOR-STROP.

No. 910,855.     Specification of Letters Patent.     Patented Jan. 26, 1909.

Application filed November 29, 1907. Serial No. 404,369.

*To all whom it may concern:*

Be it known that I, FRANK L. PINNEY, lieutenant United States Navy and a citizen of the United States, at present residing at Annapolis, in the county of Anne Arundel and State of Maryland, have invented certain new and useful Improvements in Razor-Strops; and I do hereby declare the following to be a full, clear, and exact description of the invention, such as will enable others skilled in the art to which it appertains to make and use the same.

My invention relates to razor strops, and the object of my invention is to provide such a strop that will be capable of easy folding and packing away into a small space; which shall be easy to hang onto any sized nail or hook; and which shall be capable of being hooked onto any kind of a surface or ledge that may be available, when no hook or nail is present.

To these ends my invention consists in the novel combination of parts and details of construction, more fully hereinafter described and particularly pointed out in the claims.

Referring to the accompanying drawings forming a part of this specification in which like numerals refer to like parts in all the views; Figure 1, represents a perspective view of the hook permanently attached to my strop in connection with a ledge or other surface with which my hook is adapted to engage. Fig. 2, a side elevational view showing my strop ready for packing into a small compass, and the hook holding the parts securely together. Fig. 3, a face view of my hook showing the strop hung onto a nail, and Fig. 4, a like view of a modification.

Referring to the said drawings;—1, represents the body of my strop which may be of leather, canvas or any other suitable construction; 2, the usual metal clamp which fits over the end of the body portion 1, and provided with the usual thumb screw 3. Swiveled into this clamp 2, is the elongated link 4, and pivotally attached to this link is the metal plate hook 5, provided with the circular or other opening 6, having the tapering slot 7, leading outwardly therefrom, as shown. This opening 6, is made sufficiently large to accommodate any ordinary hooks or nails that are usually found in a room, and the slot 7, is made sufficiently tapering to jam upon the body portions of any nails or hooks that may be too small to make a good fit with the opening 6. The metal plate hook 5, is curved over at 8, to form the hook portion proper, and this curvature is made of the proper size to snugly inclose the folds of the strop, when the same is to be packed away as will be more fully hereinafter disclosed. This hook portion 8, terminates in a reduced portion 9, provided with the fluting 10, and the two sharp points 11, as best shown in Fig. 3. This fluting 10, serves to give rigidity as well as resiliency to the hook portion 8, and also serves to more firmly bind the folds 12, of the strop proper, as shown in Fig. 2. The sharp points 11, are separated from each other, as shown, and thereby serve to steady the plate hook 5, when the strop is in use. These points furthermore being sharpened, readily catch into any surface that may be available around a room, and further aid in firmly holding the plate hook 5, while the strop may be readily turned upon the swivel pivot 13, of the link 4.

14, represents the usual handle attached to the strop at the end opposite the plate hook 5, and which is adapted to be inclosed in the folds proper of the strop when the same is folded and ready for packing away or traveling.

In operation, when it is desired to use my strop, the circular or other hole 6, of the plate 5, is slipped over any convenient hook or nail 15, and the said hook or nail readily jams into the tapered slot 7, as shown, and serves to firmly hold the plate hook 5, while the strop itself may be readily turned on the swivel pivot 13, and thereby used in any manner desired. If a nail or hook is not available, then any convenient ledge, shelf or other surface 16, may be utilized, by placing the points 11, of the end portion 9, of my plate into contact with said surface, as shown in Fig. 1, and the strop will then be firmly held as before, and will therefore be capable of use in any desired manner. If neither a nail nor ledge is employed as described, the hook portion 8, 9, of my plate may be hooked over any convenient hook, rod, nail or other object that may be found convenient. Of course, it is not essential that the swivel connection between the strop and plate shown in Figs. 1, 2 and 3, be employed, for the chain connection 25, shown in Fig. 4, is equally adapted for my purpose, and in some cases it will be found preferable. The chain is chosen of such a length that it will cause the hook 8, 9, to just fit over the ends of the folds when the strop is folded up for packing away. Nor is it at all essential that my plate 5, be made of sheet material, since it is evident that it may be made of wire and suitably bent into form.

When it is desired to pack my strop away, it is readily folded up, as shown in Fig. 2, with the handle portion inside the folds proper of the strop, and the hook portions 8 and 9, of the plate 5, are slipped over the folds 12, of the strop and serve to hold the same firmly in position. The fluting 10, may come against the outer surface of the folds, and serves as an additional yielding holding means, as well as the points 11.

Of course the exact details of construction of my plate hook may be varied without departing from the spirit of my invention, and therefore I do not desire to be limited to the exact construction illustrated.

Having now described my invention, what I claim is:—

1. A razor strop adapted to be folded for packing away, provided with a swiveled hook having a bent over portion of a suitable size to clasp the folds of said strop and to snugly hold the same in their folded position, substantially as described.

2. A razor strop adapted to be folded for packing away, with the handle of said strop inside the folds proper, and having a swiveled hook provided with a bent over resilient portion 8, and an end portion 9, of a suitable size to receive said folds and snugly hold them in their folded position, substantially as described.

3. A razor strop adapted to be folded for packing away, with the handle inside the folds and provided with a swiveled hook, having a bent over portion 8, and an end portion 9, provided with the points 11, of suitable dimensions to clasp the folds and hold them in their folded position, substantially as described.

4. A razor strop adapted to be folded for packing away, with the handle inside the folds, and provided with a swiveled hook provided with an opening 6; a tapered slot 7; and a bent over portion 8, of a suitable size to hold the parts in their folded position, whereby the said strop may be readily hung on a nail when used, and then folded up and held folded for traveling or packing away, substantially as described.

5. A razor strop adapted to be folded for packing away, with the handle inside the folds, and provided with a plate hook 5, having the opening 6; the tapered slot 7; the bent over portion 8; the fluting 10; and the sharp points 11; said bent over portion, fluting and points serving to hold the folds proper in their folded relation, substantially as described.

6. A razor strop adapted to be folded for packing away, with the handle of said strop inside the folds proper, and having a swiveled chain connected to the stop proper, and a hook connected to the chain, said hook provided with a bent over resilient portion 8, and an end portion 9, of a suitable size to receive said folds and snugly hold them in their folded position, substantially as described.

7. A razor strop adapted to be folded for packing away, with the handle inside the folds and provided with a swiveled chain connected to the body of the strop, and a hook connected to the chain, said hook having a bent over portion 8, and an end portion 9, provided with the points 11, of suitable dimensions to clasp the folds and hold them in their folded position, substantially as described.

In testimony whereof, I affix my signature in presence of two witnesses.

FRANK L. PINNEY.

Witnesses:
O. H. OAKLEY,
F. H. RITTENOUR.